(12) United States Patent
Takagi

(10) Patent No.: US 11,059,470 B2
(45) Date of Patent: Jul. 13, 2021

(54) IN-VEHICLE CONTROLLER AND VEHICLE CONTROL METHOD

(71) Applicant: TOYOTA JIDOSHA KABUSHIKI KAISHA, Toyota (JP)

(72) Inventor: Isao Takagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 16/594,154

(22) Filed: Oct. 7, 2019

(65) Prior Publication Data

US 2020/0156617 A1 May 21, 2020

(30) Foreign Application Priority Data

Nov. 19, 2018 (JP) .............................. JP2018-216163

(51) Int. Cl.
  *B60W 10/30* (2006.01)
  *B60W 10/02* (2006.01)
  *F16H 61/14* (2006.01)
  *F01N 3/021* (2006.01)
  *F02D 41/12* (2006.01)

(52) U.S. Cl.
  CPC ........ *B60W 10/023* (2013.01); *B60W 10/026* (2013.01); *B60W 10/0235* (2020.02); *B60W 10/30* (2013.01); *F01N 3/021* (2013.01); *F02D 41/123* (2013.01); *F16H 61/143* (2013.01); *B60W 2510/0233* (2013.01); *B60W 2710/30* (2013.01); *F01N 2900/16* (2013.01)

(58) Field of Classification Search
  CPC ............... B60W 10/026; B60W 10/30; B60W 2510/0233; B60W 2710/30; F01N 3/021; F01N 2900/16; F02D 41/123; F16H 61/143
  See application file for complete search history.

(56) References Cited

U.S. PATENT DOCUMENTS

| 5,928,111 A * | 7/1999 | Sakakibara ........... F02D 41/022 477/181 |
| 2015/0191168 A1* | 7/2015 | Mitsuyasu ............... F02D 29/02 701/54 |
| 2015/0336560 A1* | 11/2015 | Shigyo .................. B60W 20/15 701/22 |
| 2017/0151952 A1* | 6/2017 | Kamiya .............. B60W 10/026 |
| 2018/0156097 A1 | 6/2018 | Suzuki et al. |

FOREIGN PATENT DOCUMENTS

JP    2018-90154 A    6/2018

\* cited by examiner

*Primary Examiner* — Huan Le
(74) *Attorney, Agent, or Firm* — Oliff PLC

(57) ABSTRACT

An in-vehicle controller includes processing circuitry. The processing circuitry stops injection of fuel under a preset fuel cutoff condition including a lockup clutch being in an engagement state. A request for raising heating performance of a heater core is a heater actuation request, and an amount of particulate matter deposited on a filter is a deposition amount. The processing circuitry controls the lockup clutch in a disengagement state when a heater actuation request is generated and the deposition amount is less than a preset deposition amount threshold. The processing circuitry controls the lockup clutch in the engagement state when the heater actuation request is generated and the deposition amount is greater than or equal to the preset deposition amount threshold.

5 Claims, 4 Drawing Sheets

IN-VEHICLE CONTROLLER AND VEHICLE CONTROL METHOD

BACKGROUND

1. Field

The present disclosure relates to an in-vehicle controller and a vehicle control method.

2. Description of Related Art

Japanese Laid-Open Patent Publication No. 2018-90154 discloses an example of an internal combustion engine including a filter arranged in an exhaust passage to remove particulate matter (hereafter referred to as PM) from exhaust gas. The internal combustion engine burns the PM deposited on the filter to regenerate the filter by performing fuel cutoff, which stops the injection of fuel from a fuel injection valve, and supplying oxygen to the filter.

A vehicle may include a torque converter incorporating a lockup clutch. In this case, it is desirable that a preset fuel cutoff condition be met such as the lockup clutch being in an engagement state when performing fuel cutoff to regenerate the filter. When fuel cutoff is performed, the injection of fuel will be resumed if the engine speed becomes less than or equal to a fuel injection recovery speed. In this case, the time from when fuel cutoff starts to when the engine speed falls to the recovery speed will be long if the lockup clutch is engaged. Thus, if the lockup clutch is in an engagement state, fuel cutoff will be performed for a longer period than when the lockup clutch is in a disengagement state. In this manner, time for regenerating the filter is obtained when the preset fuel cutoff condition includes the lockup clutch being in an engagement state.

A cooling device of the internal combustion engine includes a heater core used for heating. The heater core forms part of an in-vehicle air conditioner. The heater core is heated by coolant that has passed through a water jacket of the internal combustion engine.

If the ambient temperature is low and there is a heater actuation request for raising the heating performance of the heater core, it is desirable that the lockup clutch be disengaged to increase the amount of heat generated by the internal combustion engine and raise the heating performance of the heater core. However, if the lockup clutch is disengaged, the above fuel cutoff condition will not be met. Thus, a heater actuation request will reduce opportunities for regenerating the filter during fuel cutoff.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect of the present disclosure, an in-vehicle controller for a vehicle including an internal combustion engine and a torque converter incorporating a lockup clutch is provided. The in-vehicle controller is configured to control the internal combustion engine and the lockup clutch. The internal combustion engine includes a fuel injection valve configured to supply fuel to a cylinder, a filter arranged in an exhaust passage and configured to remove particulate matter from exhaust gas, and a cooling device. The cooling device includes a heater passage that allows coolant, which has passed through a water jacket of the internal combustion engine, to be supplied to a heater core of an in-vehicle air conditioner. The in-vehicle controller includes processing circuitry configured to perform a process for stopping injection of fuel from the fuel injection valve when a preset fuel cutoff condition including the lockup clutch being in an engagement state is met. A request for raising heating performance of the heater core is a heater actuation request. An amount of the particulate matter deposited on the filter is a deposition amount. The processing circuitry is configured to perform a disengagement process for controlling the lockup clutch in a disengagement state when the heater actuation request is generated and the deposition amount is less than a preset deposition amount threshold. The processing circuitry is configured to perform an engagement process for controlling the lockup clutch in the engagement state when the heater actuation request is generated and the deposition amount is greater than or equal to the preset deposition amount threshold.

In another general aspect of the present disclosure, a method for controlling a vehicle including an internal combustion engine and a torque converter incorporating a lockup clutch is provided. The method includes controlling the internal combustion engine and the lockup clutch. The internal combustion engine includes a fuel injection valve configured to supply fuel to a cylinder, a filter arranged in an exhaust passage and configured to remove particulate matter from exhaust gas, and a cooling device. The cooling device includes a heater passage that allows coolant, which has passed through a water jacket of the internal combustion engine, to be supplied to a heater core of an in-vehicle air conditioner. The method includes executing a process for stopping injection of fuel from the fuel injection valve when a preset fuel cutoff condition including the lockup clutch being in an engagement state is met. A request for raising heating performance of the heater core is a heater actuation request, and an amount of the particulate matter deposited on the filter is a deposition amount. The method includes executing a disengagement process for controlling the lockup clutch in a disengagement state when the heater actuation request is generated and the deposition amount is less than a preset deposition amount threshold. The method includes executing an engagement process for controlling the lockup clutch in the engagement state when the heater actuation request is generated and the deposition amount is greater than or equal to the preset deposition amount threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An in-vehicle controller according to one embodiment will now be described with reference to FIGS. 1 to 6.

Figure 1:
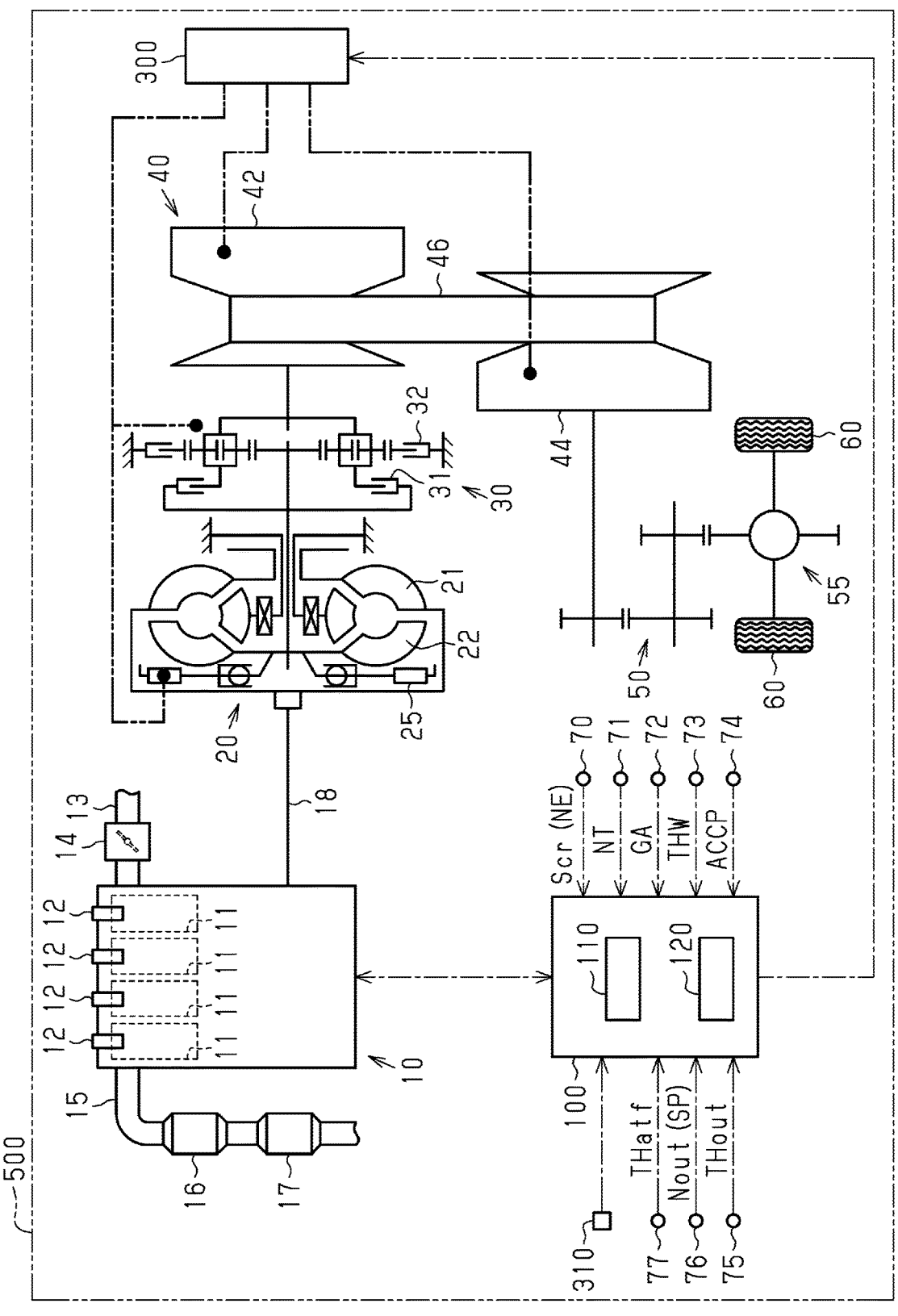
FIG. 1 is a schematic diagram of a vehicle to which an in-vehicle controller according to one embodiment is applied.

As shown in FIG. 1, an internal combustion engine 10 including cylinders 11 is installed in a vehicle 500. Each cylinder 11 includes an intake port connected to an intake passage 13. The intake passage 13 includes a throttle valve 14 that adjusts an intake air amount.

The internal combustion engine 10 includes fuel injection valves 12 that supply fuel to the cylinders 11. Each cylinder 11 includes a combustion chamber in which a mixture of air, which is drawn through the intake passage 13, and fuel, which is injected from the corresponding fuel injection valve 12, is ignited by a spark discharge and burned. Exhaust gas generated by the combustion of the air-fuel mixture is discharged out of the combustion chamber and into an exhaust passage 15 that is connected to an exhaust port of the internal combustion engine 10.

The exhaust passage 15 includes a three-way catalyst (hereafter referred to as "the catalyst") 16 that is used for exhaust gas purification. The catalyst 16 purifies the exhaust gas by oxidizing hydrocarbon (HC) and carbon monoxide (CO) in the exhaust gas and reducing nitrogen oxide (NOx) in the exhaust gas.

The exhaust passage 15 includes a filter 17 that removes particulate matter (hereafter referred to as "PM") from the exhaust gas. The filter 17 is located downstream from the catalyst 16.

The internal combustion engine 10 generates driving power sequentially transmitted via a torque converter 20 incorporating a lockup clutch, a switching mechanism 30, a continuously variable transmission 40, which is a vehicle automatic transmission, a reduction gear 50, a differential gear 55, and the like to left and right drive wheels 60.

The torque converter 20 includes an input shaft on which a pump impeller 21 is arranged. The input shaft is connected to a crankshaft 18 of the internal combustion engine 10. The torque converter 20 includes an output shaft on which a turbine impeller 22 is arranged. The output shaft is connected to the input shaft of the switching mechanism 30. In the torque converter 20, torque is transmitted between the pump impeller 21 and the turbine impeller 22 by automatic transmission fluid (ATF) to transmit torque from the input shaft to the output shaft.

The lockup clutch (hereafter LUC) 25 can be switched between the operation states of an "engagement state" and a "disengagement state" by hydraulic pressure of the ATF. In the "engagement state," torque is transmitted from the input shaft to the output shaft of the torque converter 20 by the LUC 25. In the "disengagement state," the engagement state is canceled so that the amount of torque transmitted by the LUC 25 is "0."

The switching mechanism 30 is a double-pinion type planetary gear mechanism including a forward clutch 31 and a reverse brake 32. The switching mechanism 30 includes an output shaft connected to an input shaft of the continuously variable transmission 40.

Thus, when the forward clutch 31 is engaged and the reverse brake 32 is disengaged, the driving power of the internal combustion engine 10 is input to the torque converter 20 and directly transmitted to the continuously variable transmission 40 as forward driving power. In contrast, when the forward clutch 31 is disengaged and the reverse brake 32 is engaged, the driving power of the internal combustion engine 10 input to the torque converter 20 is transmitted to the continuously variable transmission 40 as backward driving power, which is rotation in the reverse direction.

In the switching mechanism 30, when the forward clutch 31 and the reverse brake 32 are both disengaged, the transmission of driving power from the internal combustion engine 10 to the continuously variable transmission 40 is cut. This is referred to as a "neutral" state.

The continuously variable transmission 40 includes a primary pulley 42 arranged on the input shaft, a secondary pulley 44 arranged on an output shaft, and a belt 46 wound around the two pulleys to transmit the driving power from the primary pulley 42 to the secondary pulley 44. The radius of the belt 46 wound around the primary pulley 42 and the secondary pulley 44 is changed using hydraulic pressure to continuously shift the gear ratio of the continuously variable transmission 40.

A hydraulic circuit 300 filled with ATF controls the shifting of the continuously variable transmission 40, the actuation of the LUC 25, the actuation of the switching mechanism 30, and the like.

Figure 2:
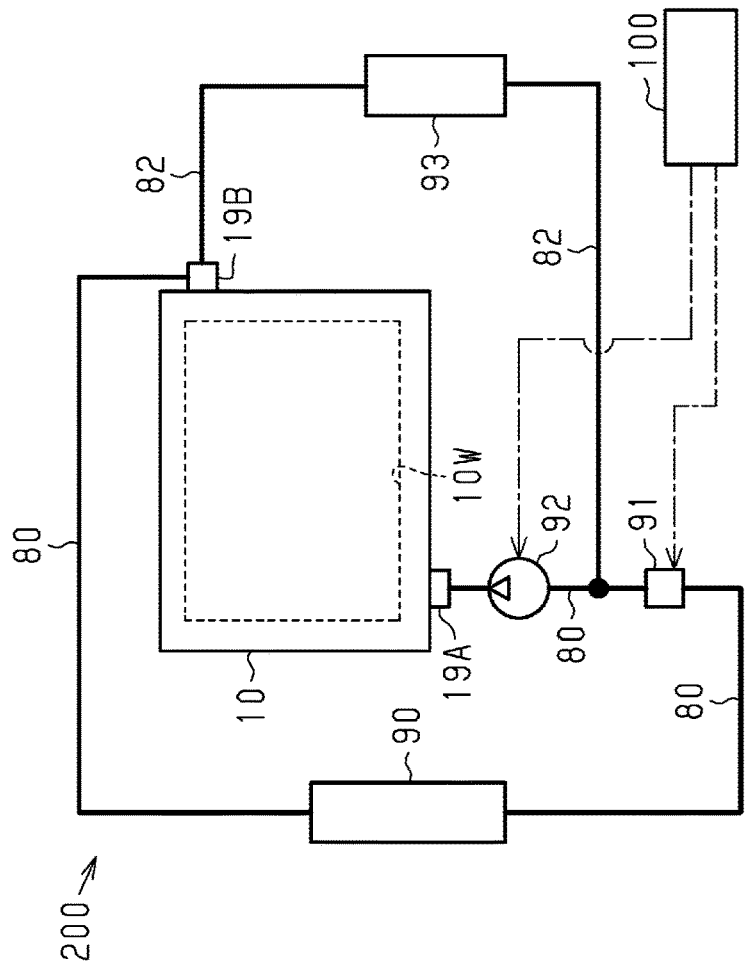
FIG. 2 is a schematic diagram of a cooling device included in an internal combustion engine according to the embodiment of FIG. 1.

FIG. 2 shows a cooling device 200 of the internal combustion engine 10. As shown in FIG. 2, the cylinder block and the cylinder head of the internal combustion engine 10 includes a water jacket 10W through which coolant flows.

The water jacket 10W includes an inlet 19A and an outlet 19B connected to a radiator passage 80. The radiator passage 80 includes a radiator 90, which exchanges heat with the ambient air to cool the coolant, an electronic thermostat 91, and an electric water pump (hereafter "pump") 92 that are sequentially arranged from the upstream side with respect to the flow direction of the coolant. Thus, when the thermostat 91 is open, the radiator passage 80 is configured so that the coolant, which has passed through the water jacket 10W, returns to the water jacket 10W through the radiator 90, the thermostat 91, and the pump 92.

The outlet 19B of the water jacket 10W is connected to an upstream end of a heater passage 82 that supplies the coolant, which has passed through the water jacket 10W, to a heater core 93, which is used for heating, of an in-vehicle air conditioner. The heater passage 82 includes the heater core 93 that heats the air sent to the passenger compartment by exchanging heat with the coolant. The heater passage 82 includes a downstream end connected to a portion of the radiator passage 80 between the thermostat 91 and the pump 92. Thus, the heater passage 82 is configured so that the coolant, which has passed through the water jacket 10W, returns to the water jacket 10W through the heater core 93. When the displacement of the pump 92 is changed, the flow rate of the coolant that passes through the water jacket 10W is changed. This changes the flow rate of the coolant flowing through the heater passage 82. The pump 92 serves as a regulator that regulates the flow rate of the coolant flowing through the heater passage 82.

An in-vehicle controller (hereafter "controller") 100 of the vehicle 500 executes various types of control such as engine control of the internal combustion engine 10, shift control of the continuously variable transmission 40, operation control of the LUC 25, and operation control of the switching mechanism 30. The controller 100 also controls the cooling device 200 by executing drive-control on the thermostat 91 and the pump 92.

The controller 100 includes a central processing unit (hereafter "CPU") 110 and a memory 120 that stores control programs and data. The CPU 110 executes the programs stored in the memory 120 to perform various types of control.

The controller 100 is connected to a crank angle sensor 70 that detects the rotation angle of the crankshaft, a rotation speed sensor 71 that detects the turbine rotation speed NT, which is the rotation speed of the turbine impeller 22, and an air flow meter 72 that detects an intake air amount GA of the internal combustion engine 10. Output signals from these sensors are input to the controller 100. The controller 100 is also connected to a coolant temperature sensor 73 that detects a coolant temperature THW as the temperature of the coolant of the internal combustion engine 10 and an accelerator position sensor 74 that detects an accelerator operation amount ACCP as the operation amount of the accelerator pedal. Output signals from these sensors are input to the controller 100. The controller 100 is also connected to an ambient temperature sensor 75 that detects an ambient temperature THout, a secondary pulley rotation speed sensor 76 that detects the rotation speed Nout of the secondary pulley 44, and a temperature sensor 77 that detects the temperature of the ATF (ATF temperature THatf). Output signals from these sensors are input to the controller 100. An operation panel 310 is arranged in the passenger compartment of the vehicle 500 to allow a vehicle occupant to operate an air conditioner. An air conditioning request (e.g., cooling request or heating request) corresponding to an operation of the operation panel 310 is input to the controller 100.

The controller 100 calculates an engine speed NE based on an output signal Scr of the crank angle sensor 70. In addition, the controller 100 calculates an engine load factor KL based on the engine speed NE and the intake air amount GA. The engine load factor KL indicates the ratio of the current cylinder inflow air amount to the cylinder inflow air amount when the internal combustion engine 10 is running steadily in a maximum load state. The cylinder inflow air amount is the amount of air that flows into each cylinder 11 in an intake stroke. The controller 100 also calculates the vehicle speed SP of the vehicle 500 based on the rotation speed Nout of the secondary pulley 44.

The engine controller 100 calculates a filter temperature Tf, which is the temperature of the filter 17, based on various types of engine operation states such as the intake charging efficiency and the engine speed NE. The engine controller 100 also calculates a PM deposition amount Ps, which is a deposition amount of particulate matter on the filter 17, based on the engine speed NE, the engine load factor KL, the filter temperature Tf, and the like.

The controller 100 changes a drive duty ratio DK of the voltage applied to the pump 92 based on the coolant temperature THW and the like to regulate the flow rate of the coolant flowing through the radiator passage 80 and the heater passage 82.

The controller 100 performs fuel cutoff if a preset fuel cutoff condition is met to stop the injection of fuel from the fuel injection valves 12 as one of various types of control.

Figure 3:
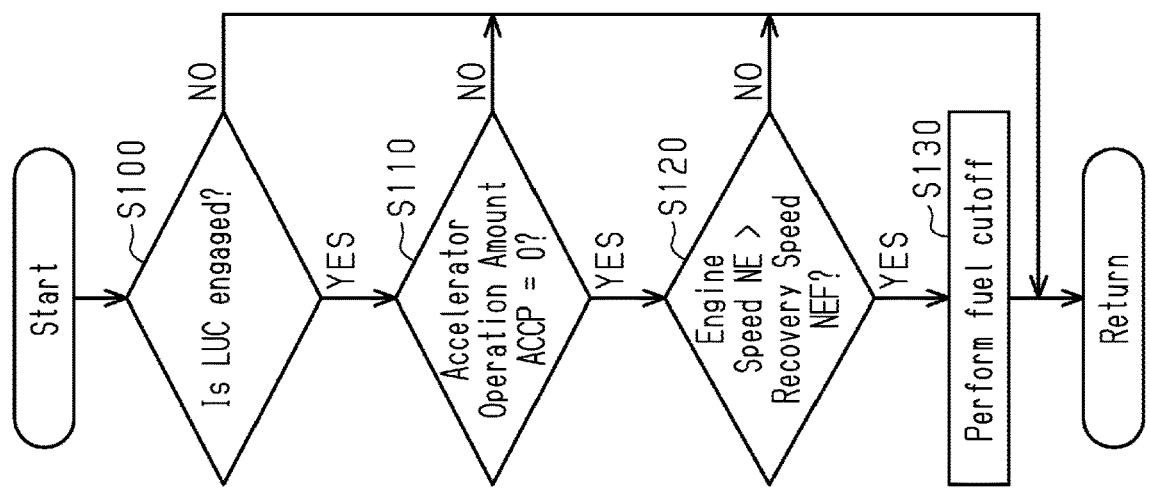
FIG. 3 is a flowchart showing the procedure of a process performed by the in-vehicle controller according to the embodiment of FIG. 1.

FIG. 3 shows the procedure of a process performed by the controller 100 to perform fuel cutoff. The CPU 110 executes programs stored in the memory 120 of the controller 100 at predetermined intervals to perform the process shown in FIG. 3. In the description hereafter, each step will be denoted by letter S followed by a numeral.

When the procedure starts, the controller 100 determines whether the LUC 25 is engaged (S100). If the controller 100 determines that the LUC 25 is engaged (S100: YES), the controller 100 determines whether the accelerator operation amount ACCP is "0" (S110). If the controller 100 determines that the accelerator operation amount ACCP is "0" (S110: YES), the controller 100 determines whether the engine speed NE is greater than a preset recovery speed NEF (S120). If the engine speed NE is less than or equal to the recovery speed NEF during fuel cutoff, the controller 100 resumes the fuel injection of the fuel injection valve 12. If the engine speed NE is greater than the recovery speed NEF (S120: YES), the controller 100 determines that the fuel cutoff condition is met and performs fuel cutoff (S130). The process is then temporarily ended. If the controller 100 gives a negative determination in S100, S110, or S120, the controller 100 temporarily ends the process.

If fuel cutoff is performed when the temperature of the filter 17 is high, a large amount of oxygen is supplied to the filter 17 to burn and reduce the PM deposited on the filter 17. The combustion of PM regenerates the filter 17.

The controller 100 performs a process for determining whether there is a heater actuation request for raising the heating performance of the heater core 93.

Figure 4:
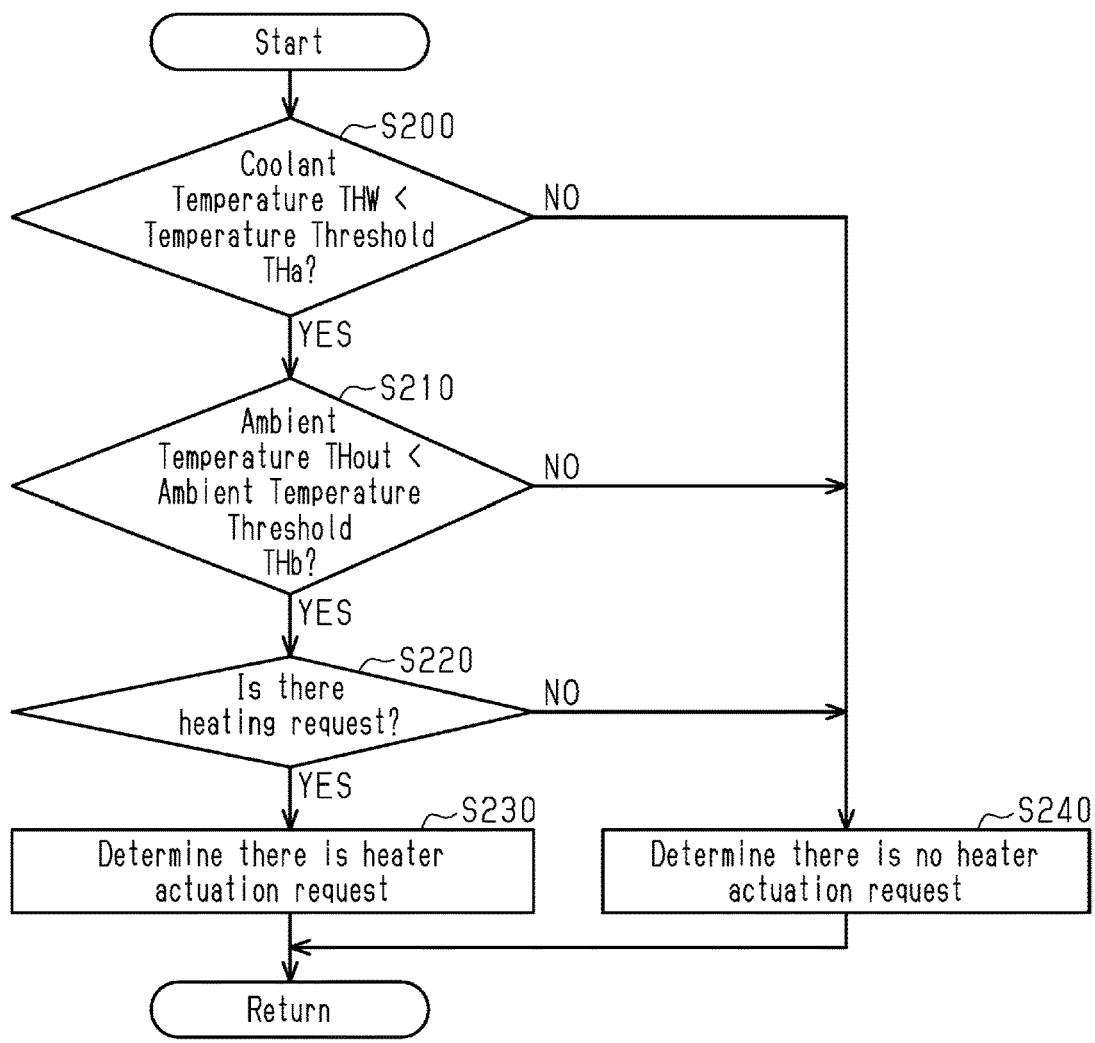
FIG. 4 is a flowchart showing the procedure of a process performed by the in-vehicle controller according to the embodiment of FIG. 1.

FIG. 4 shows the procedure of a process performed by the controller 100 to determine whether there is a heater actuation request. The CPU 110 executes programs stored in the memory 120 of the controller 100 at predetermined intervals to perform the process shown in FIG. 4.

When the procedure starts, the controller 100 determines whether the current coolant temperature THW is less than a preset temperature threshold THa (S200). The temperature threshold THa is set in advance to the coolant temperature allowing for determination that the internal combustion engine 10 has been warmed.

If the controller 100 determines that the current coolant temperature THW is less than the temperature threshold THa (S200: YES), the controller 100 determines whether the current ambient temperature THout is less than a preset ambient temperature threshold THb (S210). The ambient temperature threshold THb is set to make an appropriate determination that the current ambient temperature THout is low and the heating performance of the heater core 93 needs be raised based on the ambient temperature THout being less than the ambient temperature threshold THb.

If the controller 100 determines that the current ambient temperature THout is less than the preset ambient temperature threshold THb (S210: YES), the controller 100 determines whether a heating request has been generated by the vehicle occupant through operation of the operation panel 310 (S220).

If the controller 100 determines that a heating request has been generated (S220: YES), the controller 100 determines that there is a heater actuation request (S230) and temporarily ends this process.

If the controller 100 gives a negative determination in S200, S210, or S220, the controller 100 determines that there is no heater actuation request (S240) and temporarily ends the process.

The controller 100 selects an operation state of the LUC 25 including an "engagement state" and a "disengagement state" based on the accelerator operation amount ACCP and the vehicle speed SP. The controller 100 performs hydraulic control on the LUC 25 so that the LUC 25 is in the selected operation state.

Figure 5:
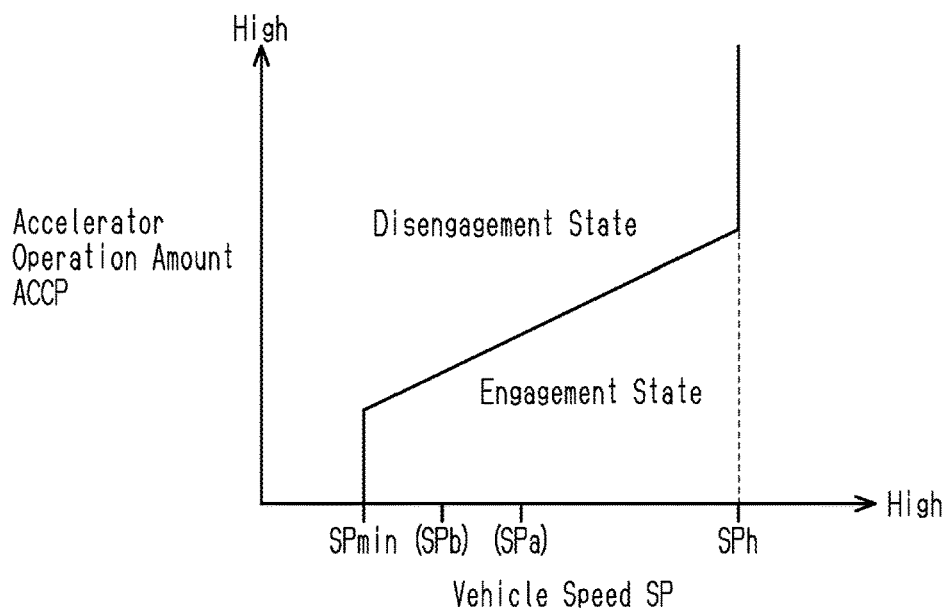
FIG. 5 is a diagram showing operation states of a lockup clutch according to the embodiment of FIG. 1.

FIG. 5 shows the operation state of the LUC 25 when there is no heater actuation request. As shown in FIG. 5, in a range where the vehicle speed SP is lower than the lower limit value SPmin, the LUC 25 is in the disengagement state regardless of the accelerator operation amount ACCP. In a range where the vehicle speed SP is greater than or equal to a preset vehicle speed SPh, which is greater than the lower limit value SPmin, the LUC 25 is in the engagement state regardless of the accelerator operation amount ACCP. In an engine operation range where the vehicle speed SP is greater than or equal to the lower limit value Spmin and less than the preset vehicle speed SPh, the LUC 25 is in the engagement state or the disengagement state based on the accelerator operation amount ACCP and the vehicle speed SP. When the vehicle speed SP is greater than or equal to the lower limit value SPmin, the LUC 25 is allowed to be controlled in the engagement state.

Figure 6:
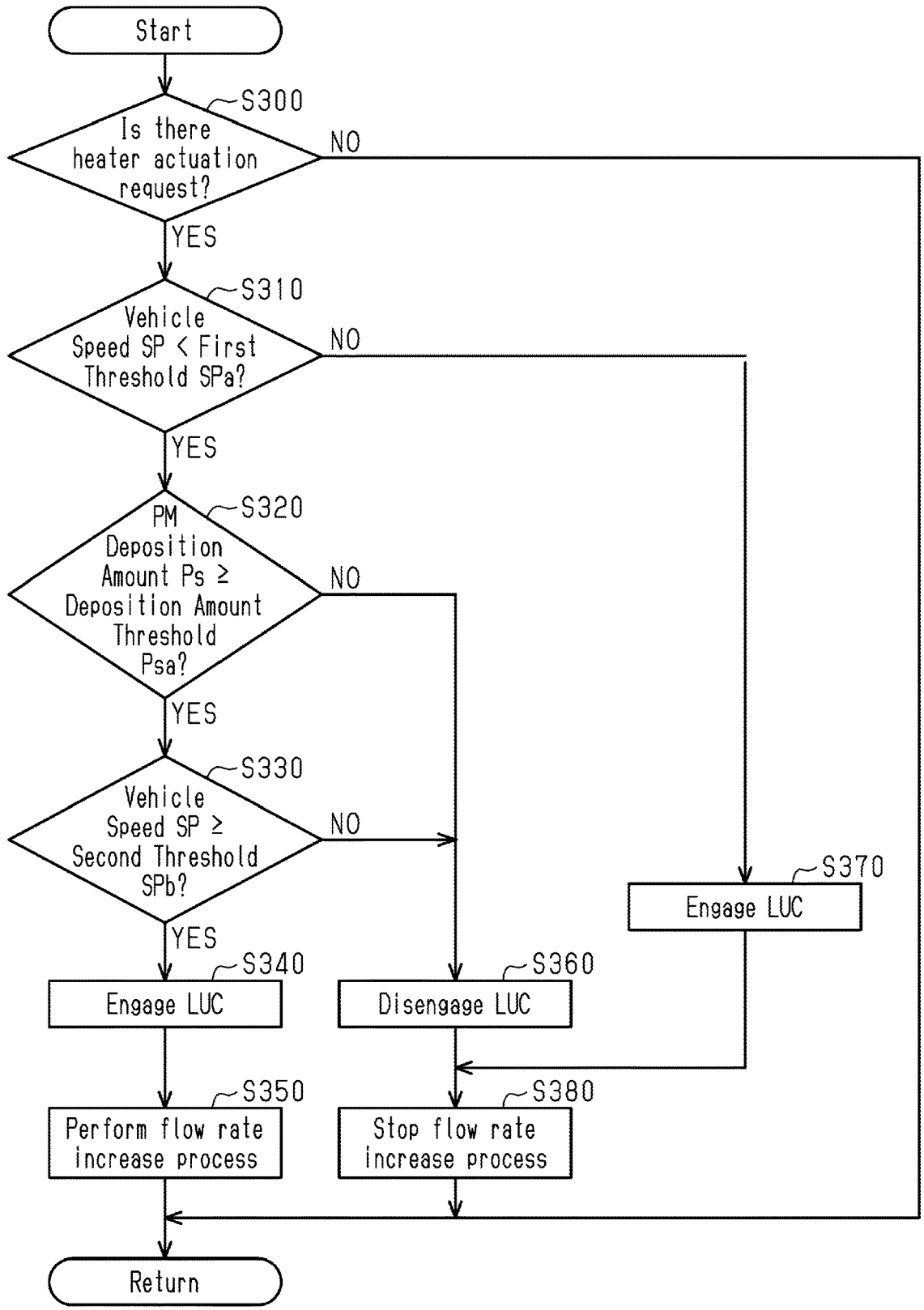
FIG. 6 is a flowchart showing the procedure of a process performed by the in-vehicle controller according to the embodiment of FIG. 1.

FIG. 6 shows a control procedure of the LUC 25 if there is a heater actuation request. The CPU 110 executes programs stored in the memory 120 of the controller 100 at predetermined intervals to perform the process shown in FIG. 6.

When the procedure shown in FIG. 6 starts, the controller 100 determines whether there is a heater actuation request (S300). If the controller 100 determines that there is no heater actuation request (S300: NO), the controller 100 temporarily ends the process.

If the controller 100 determines that there is a heater actuation request (S300: YES), the controller 100 determines whether the current vehicle speed SP is less than a first threshold SPa (S310).

As shown in FIG. 5, the first threshold SPa is set to a vehicle speed greater than the lower limit value SPmin. As described above, if there is no heater actuation request and the vehicle speed SP is greater than or equal to the lower limit value SPmin, the LUC 25 is allowed to be controlled in the engagement state. A first minimum value SP1 of the vehicle speed is set in advance. Specifically, if there is a heater actuation request and the vehicle speed SP is greater than or equal to the first minimum value SP1, the heating performance of the heater core 93 can be obtained without controlling the LUC 25 in the disengagement state. A vehicle speed greater than the first minimum value SP1 may be set as the first threshold SPa. In the present embodiment, the first threshold SPa is less than the preset vehicle speed SPh. However, this is only an example. When the vehicle speed SP is the first threshold SPa, the relationship between the first threshold SPa and the preset vehicle speed SPh may be changed as long as the heating performance of the heater core 93 can be obtained without controlling the LUC 25 in the disengagement state.

If the controller 100 determines that the current vehicle speed SP is less than the first threshold SPa (S310: YES), the controller 100 determines whether the currently calculated deposition amount Ps is greater than or equal to a preset deposition amount threshold Psa (S320). The PM deposition amount of when the filter 17 is clogged and needs to be regenerated is set in advance as the deposition amount threshold Psa.

If the controller 100 determines that the PM deposition amount Ps is greater than or equal to the deposition amount threshold Psa (S320: YES), the controller 100 determines whether the current vehicle speed SP is greater than or equal to a second threshold SPb (S330).

As shown in FIG. 5, the second threshold SPb is set to a vehicle speed greater than the lower limit value SPmin and lower than the first threshold SPa. A second minimum value SP2 of the vehicle speed is set in advance. Specifically, if the vehicle speed SP is greater than or equal to the second minimum value SP2, the temperature of the filter 17 is high enough to burn PM. The second threshold SPb may be set to a vehicle speed greater than the second minimum value SP2.

If the controller 100 determines that the current vehicle speed SP is greater than or equal to the second threshold SPb (S330: YES), the controller 100 performs an engagement process for controlling the LUC 25 in the engagement state (S340). In addition to the engagement process, the controller 100 performs a flow rate increase process that controls the pump 92 to increase the flow rate of the coolant flowing through the heater passage 82 (S350). Then, the controller 100 temporarily ends the process.

The flow rate increase process of S350 increases the drive duty ratio DK, which is set based on the coolant temperature THW and the like, by preset value A to increase the displacement of the pump 92. Preset value A is set so that the amount of heat transferred from the coolant to the heater core 93 when the LUC 25 is in the engagement state will be as close as possible to the amount of heat transferred from the coolant to the heater core 93 when the LUC 25 is in the disengagement state. When the drive duty ratio DK is increased by preset value A, the flow rate of the coolant flowing through the heater passage 82 is increased. The value of preset value A may be changed in accordance with the power consumption and the like of the pump 92.

If the controller 100 determines that the PM deposition amount Ps is not greater than or equal to the deposition amount threshold Psa in S320 (S320: NO) or if the controller 100 determines that the current vehicle speed SP is not greater than or equal to the second threshold SPb in S330 (S330: NO), the controller 100 performs a disengagement process for controlling the LUC 25 in the disengagement state (S360). In addition to the disengagement process, the controller 100 stops the flow rate increase process (S380). Then, the controller 100 temporarily ends the process.

In S380, when stopping the process that increases the drive duty ratio DK of the pump 92 by preset value A, the drive duty ratio DK of the pump 92 is returned to the value set based on the coolant temperature THW and the like. Thus, when the flow rate increase process is stopped, the flow rate of the coolant flowing through the heater passage 82 becomes lower than that when the flow rate increase process is performed. After engaging the LUC 25 in the engagement process of S340, the controller 100 performs the flow rate increase process in S350. In the flow rate increase process, the flow rate of the coolant flowing through the heater passage 82 is higher than that when the LUC 25 is disengaged in S360. If the flow rate increase process has not been performed when entering S380, the flow rate increase process remains unperformed.

If the controller 100 determines that the current vehicle speed SP is not less than the first threshold SPa (S310: NO), the controller 100 performs the same process as S340, more specifically, the controller 100 controls the LUC 25 in the engagement state (S370). After S380, the controller 100 temporarily ends the process.

The operation and advantages of the present embodiment will now be described.

(1) When there is a heater actuation request (S300: YES in FIG. 6), under the condition that that the PM deposition amount Ps is less than the deposition amount threshold Psa (S320: NO in FIG. 6), the LUC 25 is controlled in the disengagement state (S360 in FIG. 6) to increase the amount of heat generated by the internal combustion engine 10. When the amount of heat generated by the internal combustion engine 10 increases, the temperature of the coolant rises and raises the heating performance of the heater core 93.

When there is a heater actuation request (S300: YES in FIG. 6), under the condition that the PM deposition amount Ps is greater than or equal to the deposition amount threshold Psa (S320: YES in FIG. 6), the LUC 25 is controlled in the engagement state (S340 in FIG. 6). In this manner, when the LUC 25 is controlled in the engagement state, the fuel cutoff condition will be met. This increases the opportunities for regenerating the filter 17 through fuel cutoff even if there is a heater actuation request.

(2) When the LUC 25 is engaged by the engagement process of S340 shown in FIG. 6, the amount of heat generated by the internal combustion engine 10 is lower than that when the LUC 25 is disengaged by the disengagement process of S360. This lowers the heating performance of the heater core 93. However, in the present embodiment, the flow rate increase process is performed in S350 if the LUC 25 is engaged by the engagement process of S340. This increases the flow rate of the coolant flowing through the heater passage 82. Thus, the amount of heat transferred from the coolant to the heater core 93 per unit time is increased. This raises the heating performance of the heater core 93 even when the engagement process is performed in S340.

(3) Even when there is a heater actuation request, as long as the vehicle speed is high enough, the load of the internal combustion engine 10 is high and the amount of heat generated is large. In such a case, the heating performance of the heater core 93 is raised without controlling the LUC 25 in the disengagement state. Even when there is a heater actuation request (S300: YES in FIG. 6), as long as the vehicle speed SP is greater than or equal to the first threshold SPa (S310: NO in FIG. 6), the LUC 25 is controlled in the engagement state (S370 in FIG. 6). This limits decreases in the fuel economy that would result from disengagement of the LUC 25 while obtaining the heating performance of the heater core 93.

When there is a heater actuation request (S300: YES in FIG. 6), the vehicle speed SP is less than the first threshold SPa (S310: YES in FIG. 6), and the PM deposition amount Ps is less than the deposition amount threshold Psa (S320: NO in FIG. 6), the LUC 25 is controlled in the disengagement state (S360 in FIG. 6). Thus, if the vehicle speed SP is less than the first threshold SPa and there is a heater actuation request, the LUC 25 is controlled in the disengagement state to increase the amount of heat generated by the internal combustion engine 10. This raises the heating performance of the heater core 93.

Further, when the vehicle speed SP is less than the first threshold SPa (S310: YES in FIG. 6), the PM deposition amount Ps is greater than or equal to the deposition amount threshold Psa (S320: YES in FIG. 6), and the vehicle speed SP is greater than or equal to the second threshold SPb (S330: YES in FIG. 6), the LUC 25 is controlled in the engagement state (S340 in FIG. 6). Thus, the LUC 25 is controlled in the engagement state at a vehicle speed SP lower than that when the LUC 25 is controlled in the engagement state (S370 in FIG. 6) because the vehicle speed SP is greater than or equal to the first threshold SPa (S310: NO in FIG. 6). This increases the opportunities for performing fuel cutoff.

If the vehicle speed SP is proximate to the lower limit value SPmin, the load of the internal combustion engine 10 is low and the temperature of exhaust gas is low. Thus, the temperature of the filter 17 is low. When the temperature of the filter 17 is low in such a manner, even if fuel cutoff is performed and oxygen is supplied to the filter 17, the PM deposited on the filter 17 may not be burned. However, in the present embodiment, if the vehicle speed SP is greater than or equal to the second threshold SPb, which is a value greater than the lower limit value SPmin (S330: YES in FIG. 6), the LUC 25 is controlled in the engagement state (S340 in FIG. 6). Thus, compared to a situation in which the vehicle speed SP is proximate to the lower limit value SPmin, the load of the internal combustion engine 10 is greater and the temperature of the filter 17 is higher when the LUC 25 is controlled in the engagement state. In this case, PM is burned during fuel cutoff.

The present embodiment may be modified as follows. The present embodiment and the following modifications can be combined as long as the combined modifications are not in contradiction.

The processes of S350 and S380 shown in FIG. 6 may be omitted to omit the flow rate increase process. This obtains the above advantages excluding advantage (2).

The processes of S310, S330, and S370 shown in FIG. 6 may be omitted. If a positive determination is given in S300, the process of S320 may be performed. Further, if a positive determination is given in S320, the process of S340 may be performed. In other words, the process comparing the vehicle speed SP to the first threshold SPa, the process comparing the vehicle speed SP to the second threshold SPb, and processes accompanying the comparison processes may be omitted. This obtains the above advantages excluding advantage (3).

As shown in FIG. 4, the condition for determining that there is a heater actuation request is that the coolant temperature THW is less than the temperature threshold THa (S200: YES), the ambient temperature THout is less than the ambient temperature threshold THb (S210: YES), and a heating request has been generated (S220: YES). However, the condition for determining that there is a heater actuation request may be changed. The condition for determining that there is a heater actuation request may be met, for example, if at least one of the above situations is satisfied.

The electric pump 92, which serves as the regulation mechanism that regulates the flow rate of the coolant flowing through the heater passage 82 may be replaced by another mechanism. The regulation mechanism may be a mechanical water pump driven by, for example, the crankshaft 18. Such a mechanical water pump, which serves as the regulation mechanism, can increase the flow rate of the coolant flowing through the heater passage 82 by increasing the engine speed. The regulation mechanism may be a flow rate control valve arranged in the heater passage 82.

The cooling device 200 may include a heat exchanger other than the radiator 90 and the heater core 93.

In the embodiment, the continuously variable transmission 40, which serves as the transmission of the vehicle 500, may be replaced with a stepped transmission (multi-speed transmission).

The controller 100 includes a CPU 110 and a memory 120 and executes software processing. However this is only an example. For example, the controller 100 may include a dedicated hardware circuit (such as ASIC) that executes at least part of the software processes executed in the above embodiment. That is, the controller 100 may be modified to have any one of the following configurations (a) to (c). (a) A configuration including a processor that executes all of the above-described processes according to programs and a program storage device such as a memory that stores the programs. (b) A configuration including a processor that execute part of the above-described processes according to the programs and a program storage device and a dedicated hardware circuit that executes the remaining processes. (c) A configuration including a dedicated hardware circuit that executes all of the above-described processes. A plurality of software circuits each including a processor and a program storage device and a plurality of dedicated hardware circuits may be provided. That is, the above processes may be executed by processing circuitry that includes at least one of a set of one or more software circuits or a set of one or more dedicated hardware circuits. The program storage device, or computer readable media, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An in-vehicle controller for a vehicle including an internal combustion engine and a torque converter incorporating a lockup clutch, wherein the in-vehicle controller is configured to control the internal combustion engine and the lockup clutch, the internal combustion engine includes a fuel injection valve configured to supply fuel to a cylinder, a filter arranged in an exhaust passage and configured to remove particulate matter from exhaust gas, and a cooling device, and the cooling device includes a heater passage that allows coolant, which has passed through a water jacket of the internal combustion engine, to be supplied to a heater core of an in-vehicle air conditioner, the in-vehicle controller comprising:

processing circuitry configured to perform a process for stopping injection of fuel from the fuel injection valve when a preset fuel cutoff condition including the lockup clutch being in an engagement state is met, wherein a request for raising heating performance of the heater core is a heater actuation request, an amount of the particulate matter deposited on the filter is a deposition amount, the processing circuitry is configured to perform a disengagement process for controlling the lockup clutch in a disengagement state when the heater actuation request is generated and the deposition amount is less than a preset deposition amount threshold, and the processing circuitry is configured to perform an engagement process for controlling the lockup clutch in the engagement state when the heater actuation request is generated and the deposition amount is greater than or equal to the preset deposition amount threshold.

2. The in-vehicle controller according to claim 1, wherein the cooling device includes a regulation mechanism configured to regulate a flow rate of the coolant flowing through the heater passage, and the processing circuitry is configured to perform a flow rate increase process for controlling the regulation mechanism so that the flow rate when the lockup clutch is in the engagement state as a result of the engagement process is higher than the flow rate when the lockup clutch is in the disengagement state as a result of the disengagement process.

3. The in-vehicle controller according to claim 2, wherein the regulation mechanism is an electric water pump.

4. The in-vehicle controller according to claim 1, wherein the lockup clutch is allowed to be controlled in the engagement state when the heater actuation request is not generated and a vehicle speed is greater than or equal to a lower limit value, a value of the vehicle speed greater than the lower limit value is a first threshold, a value of the vehicle speed greater than the lower limit value and less than the first threshold is a second threshold, the processing circuitry is configured to control the lockup clutch in the engagement state when a condition that the heater actuation request is generated and the vehicle speed is greater than or equal to the first threshold is met, the processing circuitry is configured to perform the disengagement process when a condition that the heater actuation request is generated, the deposition amount is less than the preset deposition amount threshold, and the vehicle speed is less than the first threshold is met, and the processing circuitry is configured to perform the engagement process when a condition that the heater actuation request is generated, the deposition amount is greater than or equal to the preset deposition amount threshold, and the vehicle speed is less than the first threshold and greater than or equal to the second threshold is met.

5. A method for controlling a vehicle including an internal combustion engine and a torque converter incorporating a lockup clutch, the method comprising:

controlling the internal combustion engine and the lockup clutch, wherein the internal combustion engine includes a fuel injection valve configured to supply fuel to a cylinder, a filter arranged in an exhaust passage and configured to remove particulate matter from exhaust gas, and a cooling device, and the cooling device includes a heater passage that allows coolant, which has passed through a water jacket of the internal combustion engine, to be supplied to a heater core of an in-vehicle air conditioner;

executing a process for stopping injection of fuel from the fuel injection valve when a preset fuel cutoff condition including the lockup clutch being in an engagement state is met, wherein
 a request for raising heating performance of the heater core is a heater actuation request, and
 an amount of the particulate matter deposited on the filter is a deposition amount;

executing a disengagement process for controlling the lockup clutch in a disengagement state when the heater actuation request is generated and the deposition amount is less than a preset deposition amount threshold; and executing an engagement process for controlling the lockup clutch in the engagement state when the heater actuation request is generated and the deposition amount is greater than or equal to the preset deposition amount threshold.

* * * * *